(12) United States Patent
Warner

(10) Patent No.: US 10,375,370 B2
(45) Date of Patent: Aug. 6, 2019

(54) AUDIO CAPTURE ON MOBILE CLIENT DEVICES

(71) Applicant: Adobe Inc., San Jose, CA (US)

(72) Inventor: Steven G. Warner, San Jose, CA (US)

(73) Assignee: Adobe Inc., San Jose, CA (US)

(*) Notice: Subject to any disclaimer, the term of this patent is extended or adjusted under 35 U.S.C. 154(b) by 185 days.

(21) Appl. No.: 15/600,999

(22) Filed: May 22, 2017

(65) Prior Publication Data

US 2017/0256286 A1  Sep. 7, 2017

Related U.S. Application Data

(63) Continuation of application No. 14/728,861, filed on Jun. 2, 2015, now Pat. No. 9,704,533.

(51) Int. Cl.
| | | |
|---|---|---|
| *H04N 9/82* | (2006.01) | |
| *H04N 9/802* | (2006.01) | |
| *G11B 27/034* | (2006.01) | |
| *H04W 88/02* | (2009.01) | |
| *G11B 27/11* | (2006.01) | |
| *H04W 4/00* | (2018.01) | |
| *H04N 5/76* | (2006.01) | |
| *G11B 27/031* | (2006.01) | |
| *G11B 27/10* | (2006.01) | |
| *H04L 29/06* | (2006.01) | |

(52) U.S. Cl.
CPC .......... *H04N 9/802* (2013.01); *G11B 27/031* (2013.01); *G11B 27/034* (2013.01); *G11B 27/10* (2013.01); *G11B 27/11* (2013.01); *H04N 5/76* (2013.01); *H04N 9/8205* (2013.01); *H04W 4/00* (2013.01); *H04W 88/02* (2013.01); *H04L 65/00* (2013.01)

(58) Field of Classification Search
None
See application file for complete search history.

(56) References Cited

U.S. PATENT DOCUMENTS

| | | |
|---|---|---|
| 6,909,874 B2 | 6/2005 | Holtz et al. |
| 8,831,505 B1 | 9/2014 | Seshadri |
| 9,584,758 B1 | 2/2017 | Chen et al. |
| 9,704,533 B2 | 7/2017 | Warner |
| 2006/0087925 A1 | 4/2006 | Takai et al. |

(Continued)

OTHER PUBLICATIONS

"Pre-Interview Communication", U.S. Appl. No. 14/728,861, dated Sep. 30, 2016, 3 pages.

(Continued)

*Primary Examiner* — Mark T Monk
(74) *Attorney, Agent, or Firm* — SBMC

(57) ABSTRACT

Audio capture techniques on mobile client devices are described. Video data is obtained by one or more computing devices from a first client device associated with a first user, the video data captured by the first client device of a video scene. Audio data is obtained by the one or more computing devices from a second client device associated with a second user, the second user included in the video data of the video scene. The one or more computing devices ascertain that the audio data is associated with the video data. The association is exposed by the one or more computing device of the audio data to the video data as indicating availability of at least a portion of the audio data as a replacement to audio data captured by the first client device as part of the video data.

20 Claims, 6 Drawing Sheets

(56) References Cited

U.S. PATENT DOCUMENTS

2014/0135962 A1* 5/2014 King .................. G11B 27/10
    700/94
2016/0358630 A1 12/2016 Warner

OTHER PUBLICATIONS

"Notice of Allowance", U.S. Appl. No. 14/728,861, dated Mar. 8, 2017, 7 pages.

* cited by examiner

AUDIO CAPTURE ON MOBILE CLIENT DEVICES

BACKGROUND

The prevalence of video capture continues to follow an increase in availability of client devices that include this functionality, such as mobile phones, tablets, and so on. However, in conventional techniques the capture of images as part of the video is given greater priority than the capture of corresponding audio. For example, cameras included in these mobile client devices continue to increase to support increased richness and features.

On the other hand, audio captured by the mobile client devices is limited by an ability of microphones to capture desired audio that is to be output along with the images. This may be due to a variety of different factors, such as optimization of the microphones for phone usage and thus "up close" capture of audio, a distance between the mobile client device and a source of the audio, and so forth. Consequently, limitations of the audio may adversely affect a user's experience with the output of the images as part of the video, thereby decreasing the overall experience as a whole and thus may cause users to forgo the experience in instances in which the audio is likely to be corrupted.

SUMMARY

Audio capture techniques on mobile client devices are described. In one or more implementations, techniques are described for leveraging availability of audio data captured by other devices involving a video scene that have an increased proximity to the video scene. Video data is obtained by one or more computing devices from a first client device associated with a first user, the video data captured by the first client device of a video scene. Audio data is obtained by the one or more computing devices from a second client device associated with a second user, the second user included in the video data of the video scene. The one or more computing devices ascertain that the audio data is associated with the video data. The association is exposed by the one or more computing device of the audio data to the video data as indicating availability of at least a portion of the audio data as a replacement to audio data captured by the first client device as part of the video data.

In one or more implementations, techniques are described for replacing audio data for playback along with video data. A user interface is displayed by one or more computing devices. The user interface includes representations of video data and first audio data captured by a first client device of a video scene and second audio data captured by a second client device of the video scene. One or more inputs are received by the one or more computing devices to replace at least a portion of the first audio data with a corresponding portion of the second audio data. A file is generated by the one or more computing devices that is configured for playback that includes the portion of the second audio data configured for output along with the video data.

In one or more implementations, a system includes one or more computing devices implemented partially in hardware, the one or more computing devices configured to perform operations. The operations includes obtaining video data and first audio data from a first client device associated with a first user, the video data and the first audio data captured by the first client device of a video scene and obtaining second audio data from a second client device associated with a second user, the second client device closer to the video scene than the first client device. One or more inputs are received to replace at least a portion of the first audio data with a corresponding portion of the second audio data and a file is generated that is configured for playback that includes the portion of the second audio data configured for output along with the video data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

The amount of video captured by users has increased due to inclusion of functionality to capture video on mobile client devices such as mobile phones, tablets, and so on. Consequently, these devices are typically readily available to users and this availability has caused the increase in video capture. However, conventional video capture techniques place little emphasis on the audio that accompanies the video, which may be due to limitations of microphones included with the device. Conventional techniques to overcome these limitations involve use of dedicated hardware, which could be expensive and not readily available to a user.

Audio capture techniques involving mobile client devices is described. In one or more implementations, these techniques leverage hardware that is readily available to users to improve audio recording that is associated with images in a video. For example, first and second users may download applications from an application store via the Internet. A first user may then capture video of the second user in a video scene using a first client device associated with the first user (e.g., a mobile phone), such as in front of a stadium for a sporting event.

The second user in the example also has a second client device (e.g., a mobile phone) on the user's person, such as placed in a pocket of the second user. The second client device is used to capture audio data in a proximity of the second user, and thus of the video scene being captured by the first user. Therefore, the audio captured by the second client device has an increased likelihood of accuracy (e.g., lack of noise) over audio data captured by the first client device through a closer proximity to the second user, such as to capture speech of the second user.

The applications may then be used to share the video and audio, e.g., directly, via the cloud, and so forth. In this way, audio captured by the second user may be used to replace audio captured by the first user as described to generate a file that includes the video and the replaced audio. Therefore, mobile devices that are commonly available to users are leveraged without additional hardware through use of the applications to increase richness of audio that is configured for output along with images in the video. Further discussion of these and other examples is described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
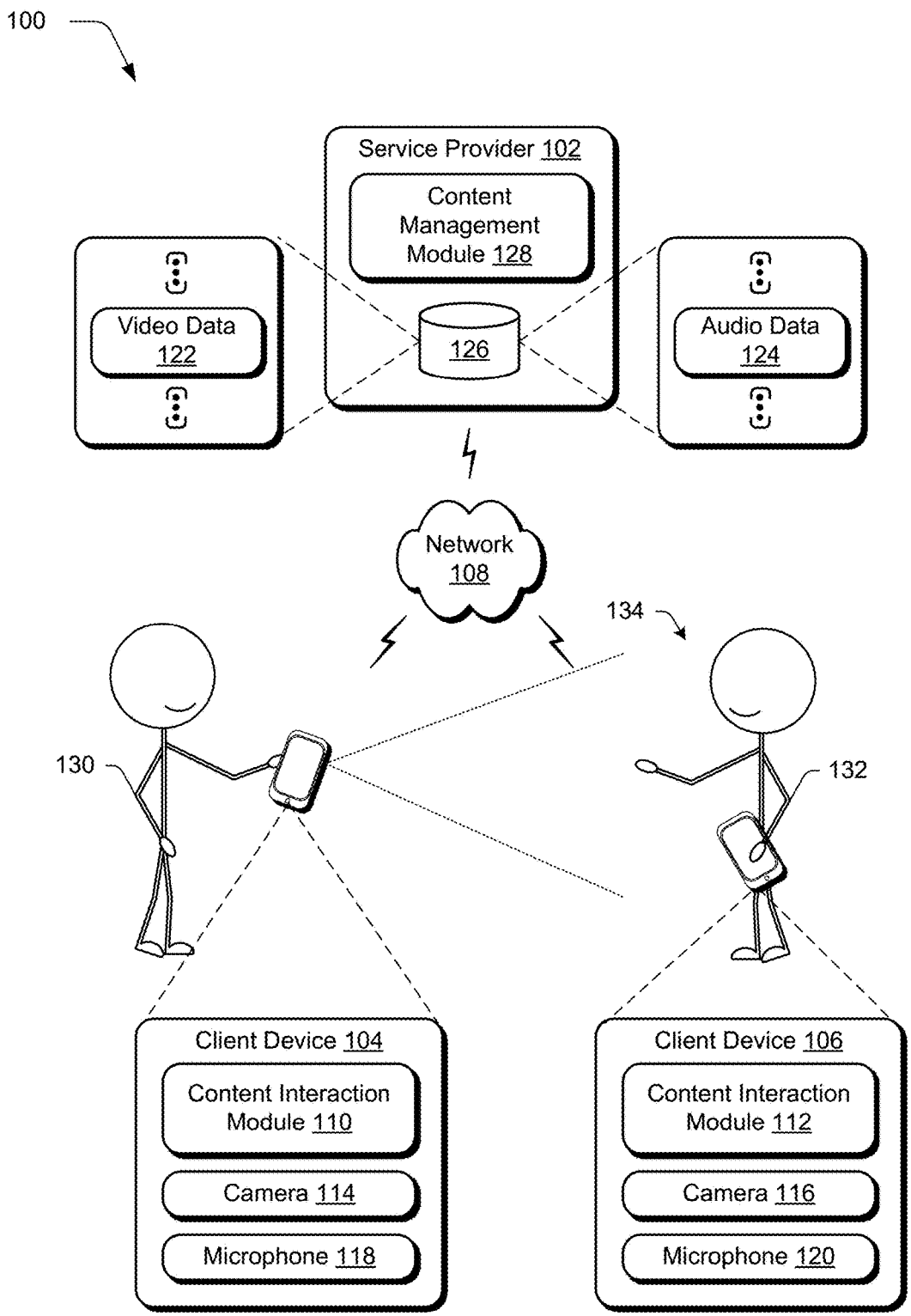
FIG. 1 is an illustration of an environment in an example implementation that is operable to employ audio and video capture techniques described herein.

FIG. 1 is an illustration of an environment 100 in an example implementation that is operable to employ the audio capture techniques described herein. The illustrated environment 100 includes a service provider 102 and client devices 104, 106 that are communicatively coupled, one to another, via a network 108.

Computing devices that implement the service provider 102 and the client devices 104, 106 may be configured in a variety of ways. For example, computing devices may be configured as a conventional desktop computer, game console, and so forth. Mobile configurations are also contemplated, such as a mobile station, a portable entertainment appliance, a mobile computing device having a housing configured in accordance with a handheld configuration (e.g., a mobile phone or tablet), a wireless phone, and so forth.

Thus, computing devices may range from full resource devices with substantial memory and processor resources (e.g., personal computers, game consoles) to low-resource devices with limited memory and/or processing resources (e.g., traditional set-top boxes, hand-held game consoles). Additionally, although instances of a single computing devices are shown, the computing devices may be representative of a plurality of different devices, such as multiple servers utilized by a business to perform operations such as by a web service by the service provider 102, a remote control and set-top box combination, and so on.

The service provider 102 may be implemented using any suitable type of server that can provide any suitable type of service that can be consumed online In at least some embodiments, the server or servers can be configured to operate in a so-called "cloud computing" environment. Cloud computing refers to a computing model that enables ubiquitous network access to a shared and virtualized pool of computing capabilities. Such computing capabilities can include, by way of example and not limitation, network, storage, processing, and memory capabilities that can be rapidly provisioned. Cloud computing can encompass a variety of cloud providers, as well as several infrastructure-as-a-service (Iaas) and platform-as-a-service (Paas) solutions.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client devices 104, 106 are illustrated as including respective content interaction modules 110, 112, cameras 114, 116, and microphones 118, 120. As is readily apparent, the cameras 114, 116 are representative of hardware functionality to capture images that form video data 122 and the microphones 118, 120 are representative of functionality to capture sound as audio data 124, such as music, spoken utterances, environmental sounds, and so forth.

The content interaction modules 110, 112 are representative of functionality to manage capture, sharing, and editing of the video and audio data 122, 124, which may be performed directly between the client devices 104, 106 and/or utilize an intermediary such as the service provider 102. Content interaction module 110, for instance, may transfer video (and even audio data) via the network 108 for storage 126 by a content management module 128. Content interaction module 112 may also transfer audio data 124 via the network 108 for storage 126 by the content management module 128.

For example, client device 104 is associated with a first user 130 in the illustration and client device 106 is associated with a second user 132. The first user 130 captures video data 122 of a video scene 134 that includes the second user 132, e.g., the second user 132 and parts of a surrounding environment of the second user 132. Both the first and second users 130, 132 in this example have obtained applications that include the content interaction module 110, 112 (e.g., online from an application store) that support association of the data captured by the devices.

Accordingly, the first user 130 may capture video data 122 of the video scene 134 that includes the second user 132. The second user 132, through use of the client device 112, captures audio data 124 of the video scene 134 also, e.g., by initiating the application and placing the client device 106 on the user's person, e.g., in a pocket of the user. In this way, the audio data 124 captured by the client device 106 may have less noise than audio data captured by client device 104 through a closer proximity to the second user 132, such as to capture spoken utterances of the user.

The content management module 128 of the service provider 102 may then expose a variety of different functionality relating to this data. This may include managing an association of the audio data 124 with the video data 122, support editing functionality such as to replace audio data captured by client device 104 with audio data captured by client device 106, and so forth. Although this functionality is described in relation to the content management module 128 in the following, this functionality may also be implemented locally by the content interaction modules 110, 112 of the client devices 104, 106, in whole or in part.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable storage media. The features of the volatility-based classifier are platform-independent, meaning that the techniques may be implemented on a variety of commercial computing platforms having a variety of processors.

Figure 2:
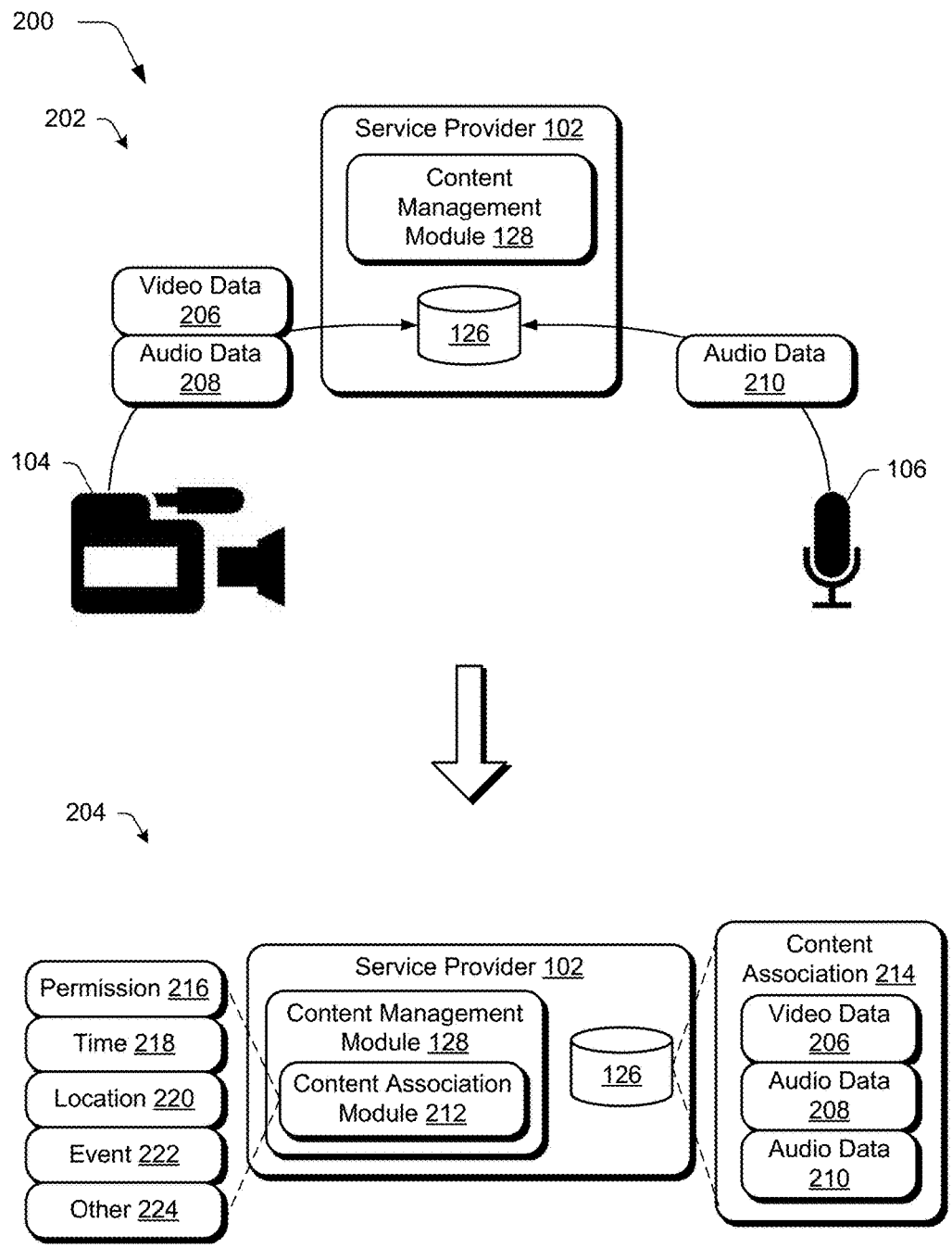
FIG. 2 depicts a system in an example implementation in which video and audio data are associated, one to another, to support audio replacement editing operations.

FIG. 2 depicts a system 200 in an example implementation in which video and audio data are associated, one to another, to support of audio replacement editing operations. The system 200 is illustrated as using first and second stages 202, 204. At the first stage 202, video data and audio data 206, 208 captured by client device 104 are transmitted via a network 108 into storage 126 of the service provider 102. A user, for instance, may initiate execution of an application on a mobile phone and capture video and audio data 206, 208, which may be streamed automatically, uploaded responsive to a user selection in a graphical user interface, and so forth.

Client device 106 also transmits audio data 210 for storage 126 by the service provider 102, which may include initiation of a companion application and automatic transfer, transfer responsive to user selection, and so on. As previously described in relation to FIG. 2, the client device 106 may be kept on a person of the second user 132 that is being filed by the first user 130.

At the second stage 204, the content management module 128 is illustrated as including a content association module 212. The content association module 212 is representative of functionality to create a content association 214 between the video and audio data 206, 208 captured by client device 104 with audio data 210 captured by client device 106.

The content association 214 may be defined and thus realized in a variety of ways. Continuing with the previous example of application usage, these applications may have corresponding user accounts that are managed by the service provider 102. As part of this management, the content management module 128 may support permissions 216 to grant access to the video and/or audio data. The first user 130 of FIG. 1, for instance, may grant permission to the second user 132 to gain access to the video and audio data 206, 208. The first user 130 may also gain access to the audio data 210 of the second user 132, e.g., through acceptance of a request for such access, by accepting the request from the first user 130, and so forth.

In another example, time 218 and/or location 220 of the video 206 and audio data 208, 210 may be used as a basis by the content association module 212 to make the content association 214. The video data 206, for instance, may have associated metadata that describes a time 218 and/or location 220 at which the video and audio data 206, 208 are captured. This may be matched with metadata of the audio data 210 to determine the content association 214.

In a first example, association with a particular event 222 may be used by the content association module 212. This association may either be explicitly or implicitly determined by the content association module 212. In the explicit example, metadata specifies a particular event, which may be included automatically by the client devices 104, 106 or manually input by a user. This metadata may specify a particular sporting event, concert, birthday party, class reunion, wedding, and so forth.

The event 222 may also be determined implicitly by the content association module 212. For example, the time 218 and location 220 may be matched with a table of events occurring at specified times and locations. The content association module 212 may then make the content association 214 based on this determination. In one or more implementations, users may be given an option to share video and/or audio data captured at these events with other users that are not specifically known to the user, such as to share concert footage and audio and so forth with other attendees of the concert.

Other 224 content associations 214 may also be determined automatically and without user intervention by the content association module 212, such as to identify video and/or audio data 206, 208 of a similar subject matter (e.g., sunsets), characteristics (e.g., night), and so forth. The content association 214 may be leveraged in a variety of ways, such as to support replacement functionality, an example of which is described in the following and shown in a corresponding figure.

Figure 3:
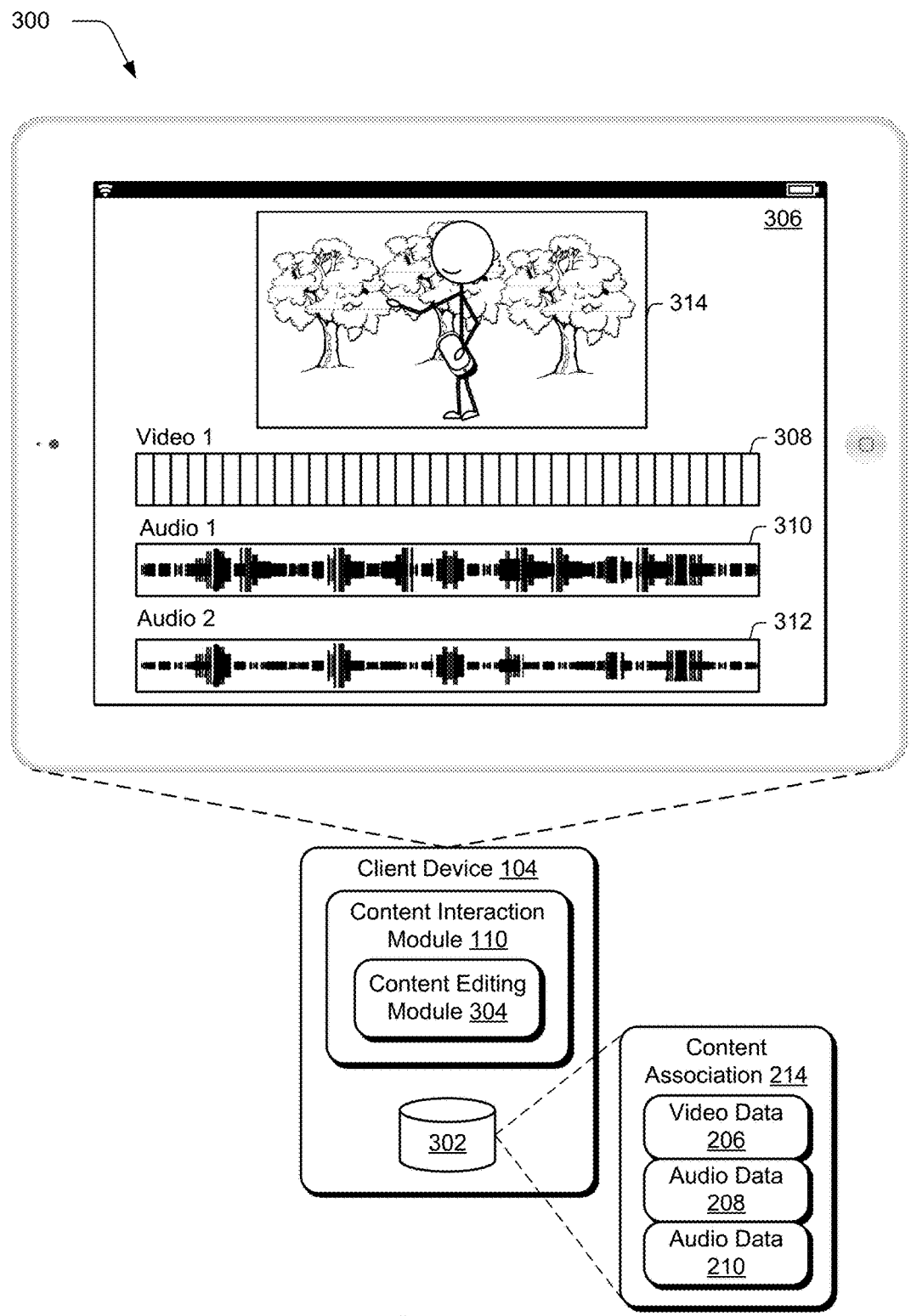
FIG. 3 depicts an example implementation of an editing technique usable to replace at least a portion of audio data using the associated audio and video data as described in relation to FIG. 2.

FIG. 3 depicts an example implementation 300 of an editing technique usable to replace at least a portion of audio data using the audio and video data captured as described in relation to FIG. 2. In this example, storage 302 of the client device 104 is illustrated as maintaining the video data 206 and audio data 208, 210 as part of the content association 214 from the previous figure. The content interaction module 110 further includes a content editing module 304 that is configured to support techniques the edit the video and audio data 206, 208, 210 to form a file for playback.

For example, the content editing module 304 is illustrated as causing output of a user interface 306 on a display device of the client device 104. The user interface 306 includes a representation 308 of the video data 206 showing a plurality of images (i.e., frames) of the video data 206 captured as part of the video by the client device 104. Audio data 208 captured along with the video data 206 is represented 310 as a time/frequency waveform that is time aligned with the frames of the video data 206.

The user interface 306 also includes a representation 312 of the audio data 210 captured by client device 106 that is associated with the video and audio data 206, 208. The representation 312 is also configured as a time/frequency representation that is time aligned with the representation 310 of the audio data 208 and the representation 308 of the video data 206. A playback window 314 is also included in the user interface 314 to view a current playback position of the video data 206.

In this example, the content editing module 304 is configured to support editing such that a whole or part of the audio data 208 associated with the video data 206 captured by client device 104 may be replaced with audio data 210 captured by client device 106. As illustrated by the representation 312, audio data 210 captured by client device 106 has less noise and thus is more readily able to recreate speech by the second user 132 in the video scene 134 as opposed to noise captured by client device 104 as shown by representation 310 of audio data 208. This is due in this example to placement of the client device 106 at a closer proximity to the second user 132 (e.g., on the user's person) than client device 104, although other examples are also contemplated, such as due to differences in ability of the microphones 118, 120 to accurately capture audio data.

A user, for instance, may selection portions of the representation 310 of audio data 208 to be replaced by corresponding portions of the representation 312 of audio data 210 through use of a cursor control device, gesture, spoken utterance, and so forth. Once selections and desired replacements have been completed, the user may initiate an operation of the content editing module 304 to form a file for playback that includes the video data 206 and selection portions of the audio data 210. In this way, a user may readily replace audio data associated with the video data 206 as desired to obtain an optimal playback experience by leveraging readily available client devices 104, 106.

Although shown as being performed at the client device 104, it should be readily apparent that the user interface 306 may be output at the client device 104 but processing performed by the content editing module 304 "in the cloud" through interaction with the service provider 102 via the network 108. A variety of other examples are also contemplated, further discussion of which is included in the following section.

Example Procedures

The following discussion describes audio capture and editing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3

Figure 4:
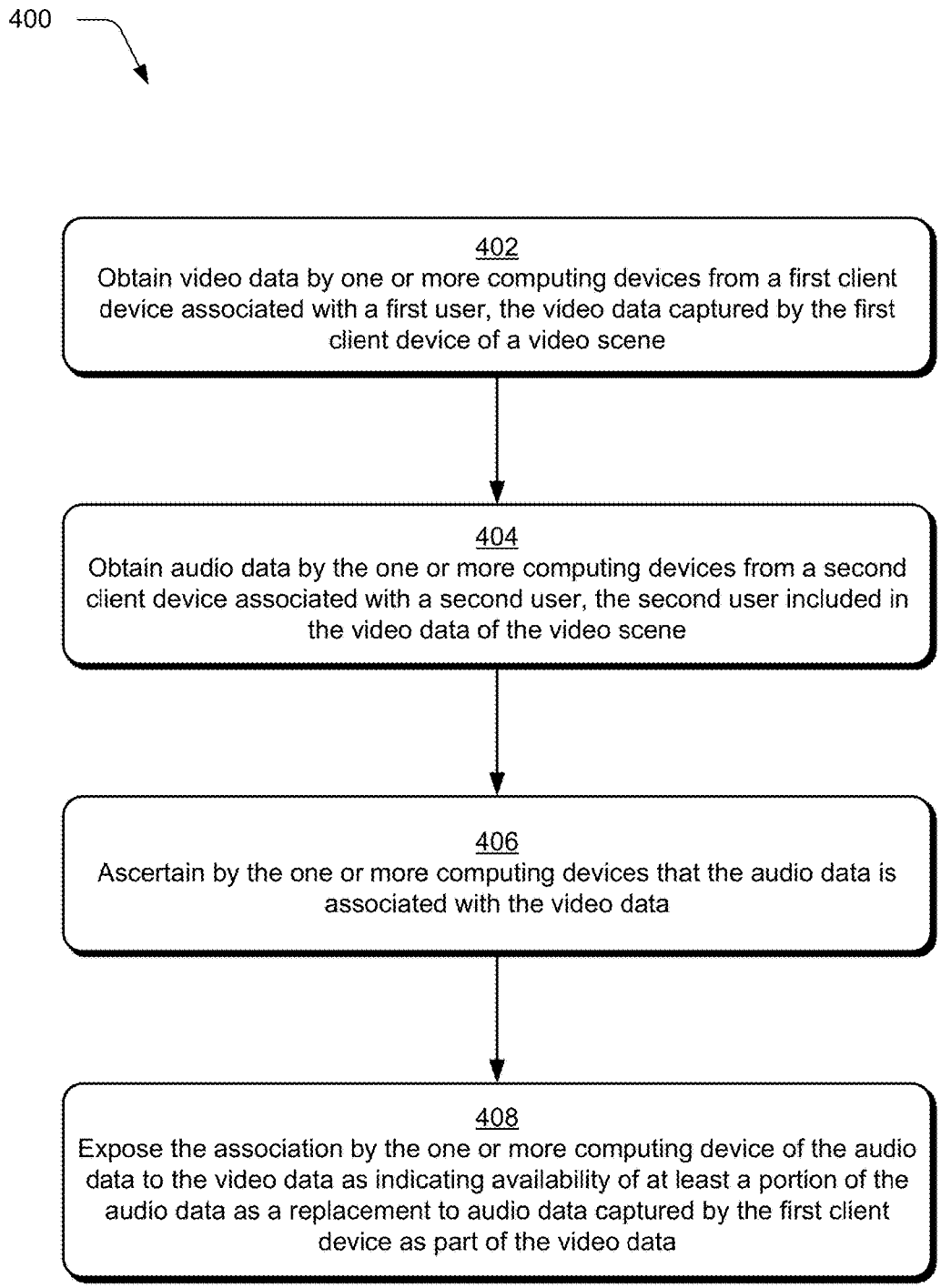
FIG. 4 is a flow diagram depicting a procedure in an example implementation in which techniques are described for leveraging availability of audio data captured by other devices involving a video scene that have an increased proximity to the video scene.

FIG. 4 depicts a procedure 400 in an example implementation in which techniques are described for leveraging availability of audio data captured by other devices involving a video scene that have an increased proximity to the video scene. Video data is obtained by one or more computing devices from a first client device associated with a first user, the video data captured by the first client device of a video scene (block 402). The service provider 102, for example, may obtain video and audio data 206, 208 via the network 108 from client device 104.

Audio data is obtained by the one or more computing devices from a second client device associated with a second user, and the second user is included in the video data of the video scene (block 404). Continuing with the previous example, the service provider 102 may also obtain audio data 210 from client device 106 via the network 108.

The one or more computing devices ascertain that the audio data is associated with the video data (block 406). The association may be defined in a variety of ways, such as via a permission 216, time 218, location 220, event 222, or other 224 association indicating that audio data 210 is usable to replace at least a portion of audio data 208 that is captured along with the video data 206 by client device 104.

Figure 5:
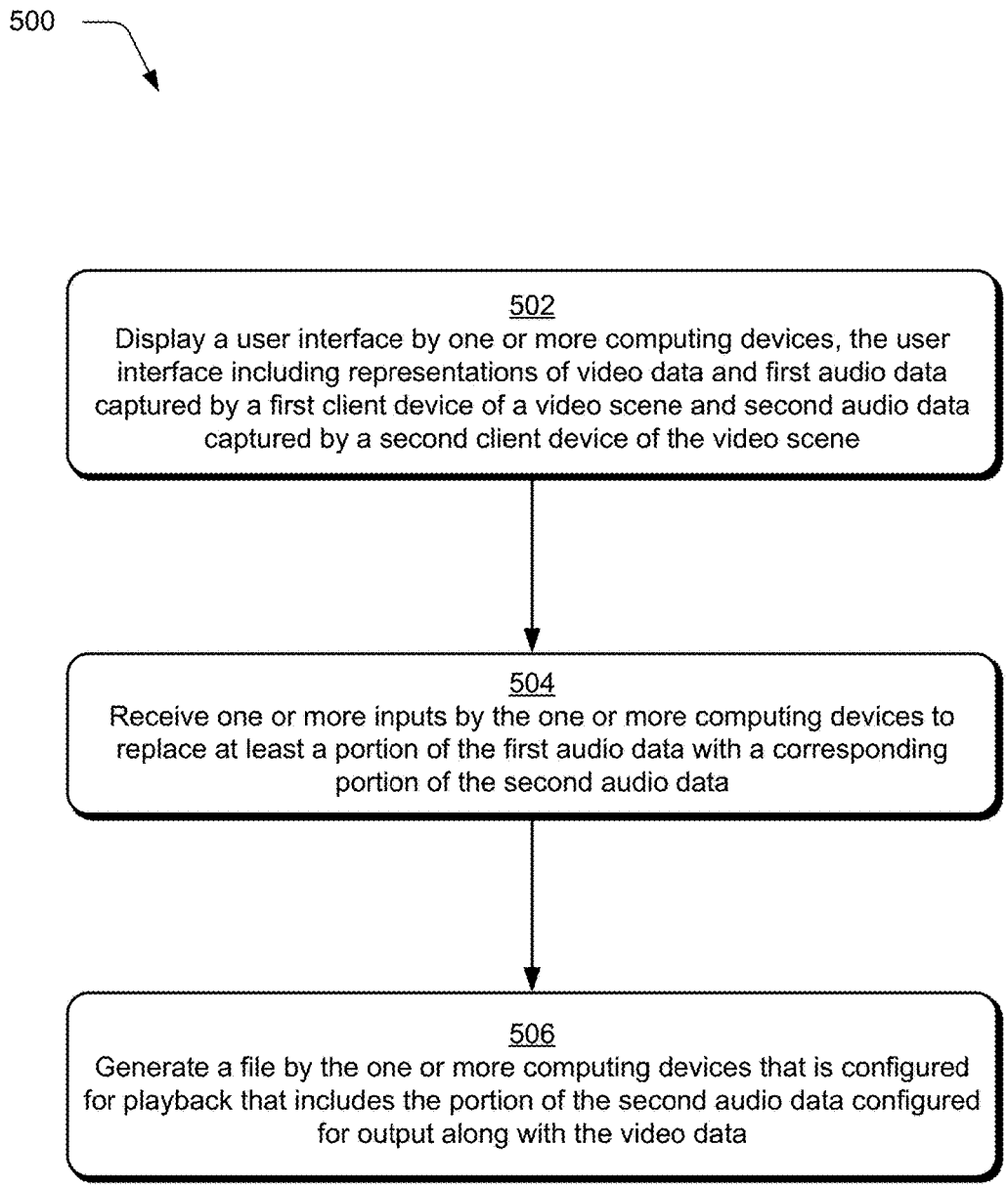
FIG. 5 is a flow diagram depicting a procedure in an example implementation in which techniques are described for replacing audio data for playback along with video data.

The association is exposed by the one or more computing device of the audio data to the video data as indicating availability of at least a portion of the audio data as a replacement to audio data captured by the first client device as part of the video data (block 408). This may include indicating to a user of client device 104 that audio data 210 is available via the service provider 102 for download, output in a user interface 306 configured to support editing and generation of a file for playback, and so forth. In this way, availability is leveraged of audio data captured by other devices involving a video scene that have an increased proximity to the video scene FIG. 5 depicts a procedure 500 in an example implementation in which techniques are described for replacing audio data for playback along with video data. A user interface is displayed by one or more computing devices. The user interface includes representations of video data and first audio data captured by a first client device of a video scene and second audio data captured by a second client device of the video scene (block 502). User interface 306, for instance, includes a representation 308 of images of video data 206 and a representation 310 of audio data 208 captured by client device 104. The user interface 306 also includes a representation 312 of audio data 210 captured by client device 106.

One or more inputs are received by the one or more computing devices to replace at least a portion of the first audio data with a corresponding portion of the second audio data (block 504). The inputs, for instance, may select a range of time in the time/frequency representation 312 that is to be output along with the video data 308.

A file is generated by the one or more computing devices that is configured for playback that includes the portion of the second audio data configured for output along with the video data (block 506). The content editing module 304 may then employ a codec to form the file for playback that includes the video data 206 and the audio data 210. A variety of other examples are also contemplated as described above.

Example System and Device

Figure 6:
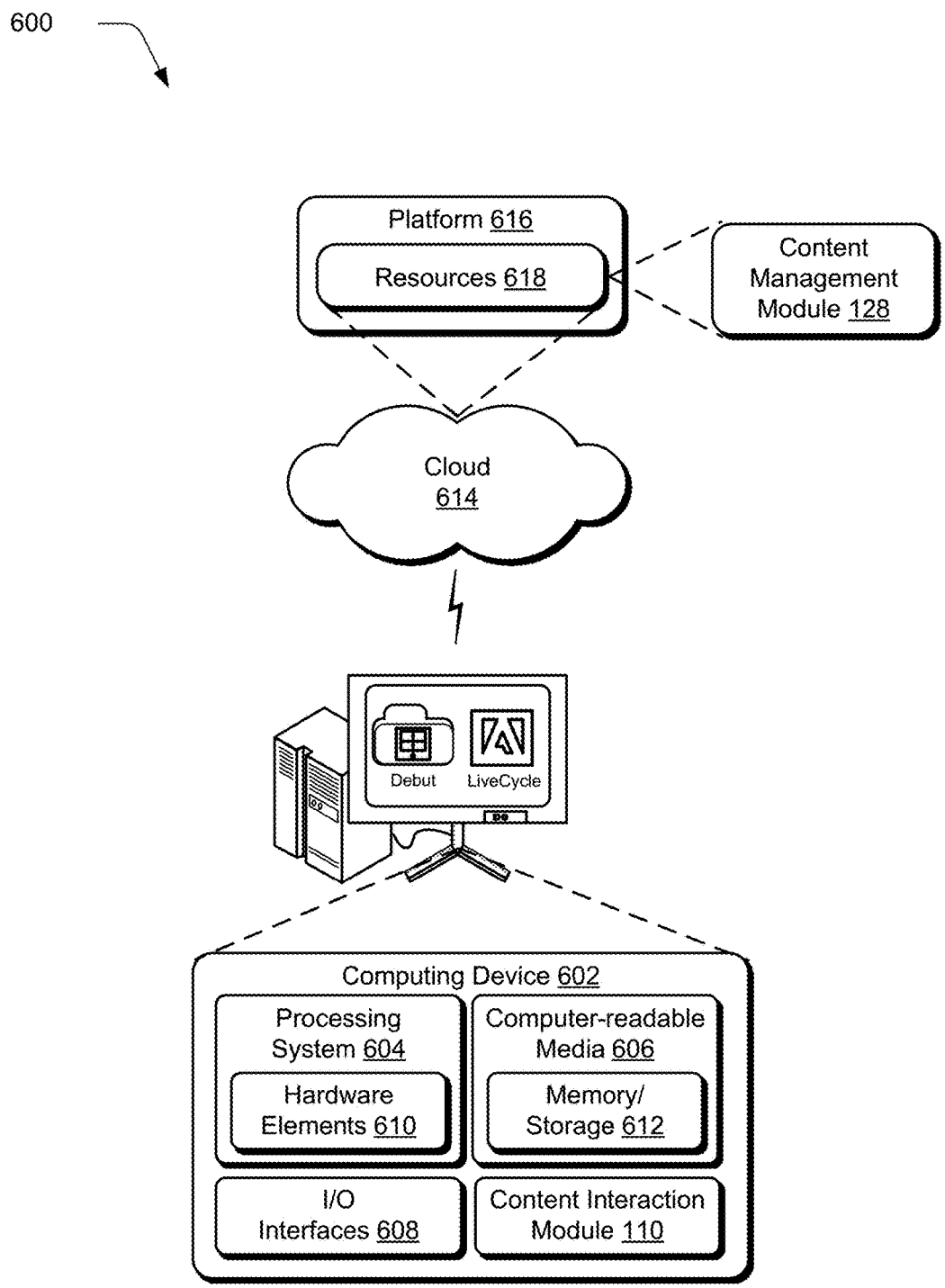
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the content interaction module 110 and content management module 128. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of leveraging availability of audio data captured by another device, the method comprising:
    capturing, by a first client device, video data and first audio data of a video scene;
    determining, by the first client device, that second audio data is associated with the video data, the second audio data captured by a second client device;
    gaining access, by the first client device, to the second audio data;
    receiving, by the first client device, one or more inputs to replace at least a portion of the first audio data with a corresponding portion of the second audio data; and
    generating a file configured for playback that includes the corresponding portion of the second audio data configured for output along with the video data.

2. A method as described in claim 1, wherein the determining that the second audio data is associated with the video data is based in part on a time and location of capturing the second audio data.

3. A method as described in claim 2, wherein the time and location of capturing the second audio data is determined based on metadata associated with the second audio data.

4. A method as described in claim 3, wherein the metadata specifies a particular event via manual input from a user of the second client device.

5. A method as described in claim 3, wherein the metadata specifies a particular event included automatically by the second client device.

6. A method as described in claim 3, wherein the determining includes a comparison of the metadata with a table of events occurring at specified times and locations.

7. A method as described in claim 1, wherein the determining includes receiving, from a service provider, an indication of an association of the second audio data with the first video data.

8. A method as described in claim 1, wherein gaining access includes accessing the second audio data via a service provider storing the second audio data.

9. A method as described in claim 1, wherein the one or more inputs are received via a user interface of the first client device, the user interface including a representation of the video data, the first audio data, and the second audio data.

10. A method as described in claim 1, wherein the generated file includes the corresponding portion of the second audio data, another portion of the first audio data, and the video data.

11. A computing device comprising:
    a processing system; and
    a computer-readable storage medium having stored thereon instructions that implement a platform of the computing device that, responsive to execution by the processing system, cause the processor to perform operations comprising:
        capturing video data and first audio data of a video scene;
        ascertaining, via a service provider, that second audio data is associated with the video data, the second audio data captured by another computing device;
        gaining access, via the service provider, to the second audio data;
        replacing at least a portion of the first audio data with a corresponding portion of the second audio data; and
        generating a file configured for playback that includes the corresponding portion of the second audio data configured for output along with the video data.

12. A computing device as described in claim 11, wherein the operations further comprise streaming the captured video data to the service provider to match the captured video data to the second audio data.

13. A computing device as described in claim 11, wherein the operations further comprise uploading, in response to a user input, the captured video data to the service provider for matching the captured video data with the second audio data.

14. A computing device as described in claim 11, wherein the gaining access comprises requesting, from the service provider, access to the second audio data.

15. A computing device as described in claim 11, wherein the computing device is one of a mobile phone or a tablet computing device.

16. A computing device as described in claim 11, wherein the operations further comprise facilitating the ascertaining and the gaining access via a previously downloaded application.

17. In a digital medium environment to leverage availability of audio data captured by another device, a system comprising:
    means for capturing video data and first audio data of a video scene, the video data including metadata describing one or more of the time or location at which the video data is captured;
    means for ascertaining, based in part on the metadata of the video data, that second audio data is associated with the video data, the second audio data captured by the other device and including metadata describing one or more of a time or location at which the second audio data is captured;
    means for gaining access to the second audio data;
    means for replacing at least a portion of the first audio data with a corresponding portion of the second audio data.

18. A system as described in claim 17, wherein the other device is closer to the video scene than the first client device.

19. A system as described in claim 17, wherein the association is ascertained based at least in part on matching the metadata of the video data and the metadata of the audio data.

20. A system as described in claim 17, wherein one or both of the system and the other device includes a mobile phone.

* * * * *